(12) United States Patent
Singh

(10) Patent No.: US 10,635,429 B2
(45) Date of Patent: Apr. 28, 2020

(54) SYSTEMS AND METHODS OF JUST-IN-TIME PROACTIVE NOTIFICATION OF A PRODUCT RELEASE CONTAINING A SOFTWARE FIX

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/144,344

(22) Filed: Sep. 27, 2018

(65) Prior Publication Data

US 2020/0104110 A1  Apr. 2, 2020

(51) Int. Cl.
| | |
|---|---|
| G06F 8/65 | (2018.01) |
| G06F 11/07 | (2006.01) |
| H04L 29/08 | (2006.01) |
| G06F 9/54 | (2006.01) |
| H04L 9/06 | (2006.01) |
| G06F 16/901 | (2019.01) |

(52) U.S. Cl.
CPC .............. *G06F 8/65* (2013.01); *G06F 9/542* (2013.01); *G06F 11/079* (2013.01); *G06F 11/0793* (2013.01); *G06F 16/9014* (2019.01); *H04L 9/0643* (2013.01); *H04L 67/34* (2013.01)

(58) Field of Classification Search
CPC .......... G06F 8/65; G06F 9/542; G06F 11/079; G06F 11/0793; G06F 16/9014; H04L 9/0643; H04L 67/34

USPC ......................................................... 717/168
See application file for complete search history.

(56) References Cited

U.S. PATENT DOCUMENTS

| | | | |
|---|---|---|---|
| 7,062,763 B2 * | 6/2006 | Ali-Santosa | G06F 8/65 |
| | | | 714/E11.135 |
| 9,009,539 B1 | 4/2015 | Kompotis et al. | |

(Continued)

OTHER PUBLICATIONS

Cadar et al., "Multi-version Software Updates," IEEE, 2012, 5pg. (Year: 2012).*

(Continued)

*Primary Examiner* — Ryan D. Coyer
(74) *Attorney, Agent, or Firm* — BainwoodHuang

(57) ABSTRACT

Techniques for providing notifications to users of software product releases that contain software fixes for errors or exceptional events experienced during execution of application programs. The techniques can include proactively generating a signature that corresponds to an error event experienced during execution of an application program, providing the signature to hosted services for determining whether a subsequent release of the application program exists containing a fix to correct the error event, and, having determined that a subsequent release of the application program exists, receiving a notification pertaining to the subsequent release, including information for downloading the subsequent release to a user computer. In this way, notifications of software product releases that address error events experienced during execution of application programs can be provided to users in a just-in-time (JIT) fashion for subsequent downloading of the software product releases to their respective computers.

18 Claims, 5 Drawing Sheets

(56) References Cited

U.S. PATENT DOCUMENTS

| | | |
|---|---|---|
| 9,218,000 B2 | 12/2015 | McLaughlin et al. |
| 9,367,381 B2 | 6/2016 | Huang et al. |
| 9,465,719 B2 | 10/2016 | Husar et al. |
| 9,471,594 B1 * | 10/2016 | Schnegelberger .... G06F 16/185 |
| 9,785,537 B2 | 10/2017 | Bhogal et al. |
| 9,871,815 B2 | 1/2018 | Ouchn |
| 2013/0047145 A1 * | 2/2013 | Cui .......................... G06F 8/65 717/168 |
| 2014/0109053 A1 * | 4/2014 | Vasudevan .......... G06F 11/3664 717/124 |

OTHER PUBLICATIONS

Park et al., "An Empirical Study of Supplementary Bug Fixes," IEEE, 2012, 10pg. (Year: 2012).*
Tran et al., "Applying Semantic Techniques to Search and Analyze Bug Tracking Data," Springer, 2009, 24pg. (Year: 2009).*

* cited by examiner

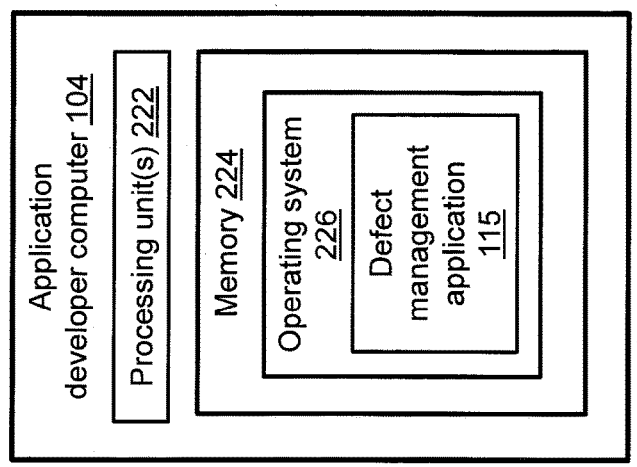
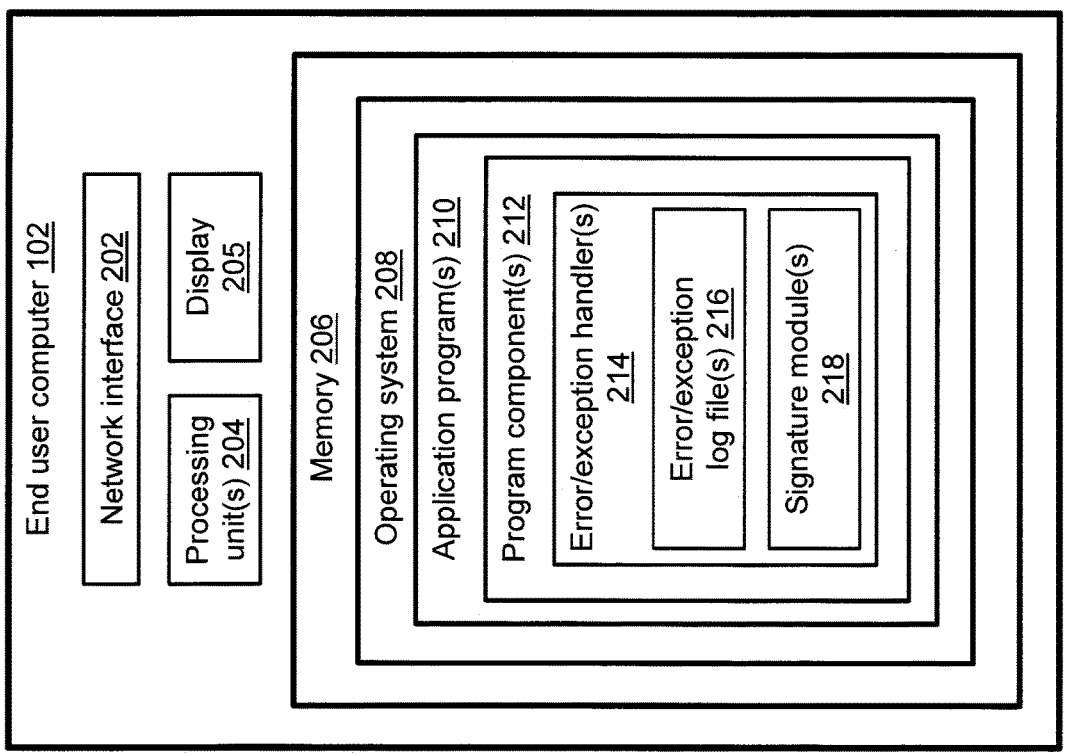

SYSTEMS AND METHODS OF JUST-IN-TIME PROACTIVE NOTIFICATION OF A PRODUCT RELEASE CONTAINING A SOFTWARE FIX

BACKGROUND

Application developers typically create application programs for distribution to end users. Such distribution is often accomplished through the application developer's website or a public or private application store, from which end users can download and install desired application programs on their desktop computers, laptop computers, tablet computers, mobile devices, and/or any other suitable computers or computerized devices. Once an application program is downloaded and installed on an end user's computer or computerized device, the computer or computerized device can execute the application program on its operating system to perform functionality associated with the application program.

SUMMARY

From time to time during execution of an application program on a computer or computerized device, the application program may abnormally terminate (e.g., "crash") or throw an exception. For example, the application program may crash in response to a programming error, or an error encountered by the operating system of the computer or computerized device. Further, the application program may throw an exception upon occurrence of an exceptional event, such as a null pointer exception, a divide-by-zero exception, a page fault exception, etc. While the application program may sometimes be incapable of recovering from certain errors encountered during its execution, the application program may be allowed to gracefully recover and continue execution once an exception is thrown and caught by an exception handler, if the exception handler can successfully handle or service the exception.

Having experienced a particular error or exceptional event during execution of a current release of an application program, an end user may wish to determine whether a subsequent release of the application program has addressed the particular error or exceptional event. For example, in a subsequent release of the application program, an application developer may have provided a software fix that makes the error less likely to be encountered, the exceptional event less likely to occur, or the error or exceptional event not likely to be encountered or occur at all. However, obtaining information regarding whether such a subsequent release of the application program exists can be a lengthy and time-consuming process, during which the end user might perform multiple searches of the Internet and/or make multiple calls to customer service personnel in an effort to obtain the desired information. Indeed, the customer service personnel themselves may be unable to determine whether a subsequent release of the application program contains a software fix that addresses a particular error or exceptional event, as such software product release information (including a complete list of software issues fixed in the application program) is generally not collected and maintained in a useful and systematic manner.

Techniques are disclosed herein for providing notifications to end users of software product releases that contain software fixes for particular errors or exceptional events experienced during execution of application programs. The disclosed techniques can include proactively generating a signature that corresponds to an error event experienced during execution of an application program, and providing the signature, along with a component-specific data element that ties the signature to a program component of the application program in which the error event occurred, to one or more hosted services for use in determining whether a subsequent release of the application program exists containing a fix to correct the error event. The disclosed techniques can further include, having determined that such a subsequent release of the application program exists, receiving a notification pertaining to the subsequent release of the application program, including information for downloading the subsequent release of the application program to an end user computer. In this way, notifications of software product releases that address particular errors or exceptional events experienced during execution of application programs can be provided to end users in a just-in-time (JIT) fashion for subsequent downloading of the software product releases to their respective end user computers.

In certain embodiments, a method includes receiving, at a host computing system from an end user computer, a signature that corresponds to an error event occurring during execution of an application program on the end user computer, and comparing, by the host computing system, the signature to one or more signature indexes to determine a match between the signature and an entry of the one or more signature indexes. The entry pertains to a subsequent release of the application program containing a fix to correct the error event. The method further includes, having determined the match between the signature and the respective signature index, preparing, by the host computing system from information pertaining to the subsequent release of the application program, a notification of the subsequent release of the application program, and sending the notification of the subsequent release of the application program to the end user computer, causing the notification to display on the end user computer, and enabling an update of the application program on the end user computer that prevents occurrence of the error event during execution of the application program.

In certain arrangements, the respective signature index has a first data element corresponding to a program component of the application program in which the error event occurred, and the method further includes deriving, by the host computing system, an identification of the program component of the application program from the first data element associated with the respective signature index.

In certain arrangements, the signature has a second data element corresponding to the program component of the application program, and the method further includes determining, by the host computing system, that the derived identification of the program component of the application program is indicative of the program component corresponding to the second data element associated with the signature.

In certain arrangements, the fix to correct the error event is included in a defect ticket stored by a defect management server computer, and the method further includes detecting the defect ticket stored by the defect management server computer.

In certain arrangements, the detecting of the defect ticket includes polling the defect management server computer for the defect ticket.

In certain arrangements, the defect ticket contains information pertaining to the error event for which the fix was provided, and the method further includes, having detected the defect ticket, accessing the information pertaining to the error event from the defect ticket, and generating the respective signature index based on the information pertaining to the error event associated with the information of the defect ticket.

In certain arrangements, the defect ticket contains information pertaining to the program component of the application program in which the error event occurred, and the method further includes, having detected the defect ticket, accessing the information pertaining to the program component of the application program from the defect ticket, and generating the first data element corresponding to the program component of the application program based on the information pertaining to the program component from the defect ticket.

In certain arrangements, the defect ticket contains information pertaining to the subsequent release of the application program, and wherein the method further includes, having detected the defect ticket, accessing the information pertaining to the subsequent release of the application program from the defect ticket. The preparing of the notification of the subsequent release of the application program includes preparing the notification from the information pertaining to the subsequent release accessed from the defect ticket. The information pertaining to the subsequent release of the application program includes a hyperlink to a location where the subsequent release can be accessed for download to the end user computer.

In certain further embodiments, a system includes at least one server computer configured to host specified services. The hosted specified services include a hosted signature matching service. The hosted signature matching service is configured (i) to receive, from an end user computer, a signature that corresponds to an error event occurring during execution of an application program on the end user computer, (ii) to compare the signature to one or more signature indexes to determine a match between the signature and an entry of the one or more signature indexes, the entry pertaining to a subsequent release of the application program containing a fix to correct the error event, (iii) having determined the match between the signature and the respective signature index, to prepare, from information pertaining to the subsequent release of the application program, a notification of the subsequent release of the application program, and (iv) to send the notification of the subsequent release of the application program to the end user computer, causing the notification to display on the end user computer, and enabling an update of the application program on the end user computer that prevents occurrence of the error event during execution of the application program.

In certain arrangements, the respective signature index has a first data element corresponding to a program component of the application program in which the error event occurred, and the hosted signature matching service is further configured to derive an identification of the program component of the application program from the first data element associated with the respective signature index.

In certain arrangements, the signature has a second data element corresponding to the program component of the application program, and the hosted signature matching service is further configured to determine that the derived identification of the program component of the application program is indicative of the program component corresponding to the second data element associated with the signature.

In certain arrangements, the fix to correct the error event is included in a defect ticket stored by a defect management server computer, and at least one second server computer provides a monitoring service. The monitoring service is configured to detect the defect ticket stored by the defect management server computer.

In certain arrangements, the monitoring service is further configured to poll the defect management server computer for the defect ticket.

In certain arrangements, the defect ticket contains information pertaining to the error event for which the fix was provided, and the monitoring service is further configured, having detected the defect ticket, to access the information pertaining to the error event from the defect ticket.

In certain arrangements, the at least one second server computer further provides a signature generating service, and the signature generating service is configured to generate the respective signature index based on the information pertaining to the error event associated with the information of the defect ticket.

In certain arrangements, the defect ticket contains information pertaining to the program component of the application program in which the error event occurred, and the monitoring service is further configured, having detected the defect ticket, to access the information pertaining to the program component of the application program from the defect ticket.

In certain arrangements, the at least one second server computer further provides a signature generating service, and the signature generating service is configured to generate the first data element corresponding to the program component of the application program based on the information pertaining to the program component associated with the information of the defect ticket.

In certain arrangements, the defect ticket contains information pertaining to the subsequent release of the application program, and the monitoring service is further configured, having detected the defect ticket, to access the information pertaining to the subsequent release of the application program from the defect ticket. The hosted signature matching service is further configured to prepare the notification from the information pertaining to the subsequent release accessed from the defect ticket. The information pertaining to the subsequent release of the application program includes a hyperlink to a location where the subsequent release can be accessed for download to the end user computer.

In certain further embodiments, a computer program product includes non-transitory, computer-readable media having instructions that, when executed by control circuitry of a computerized apparatus, cause the control circuitry to perform a method including receiving, at a host computing system from an end user computer, a signature that corresponds to an error event occurring during execution of an application program on the end user computer, and comparing, by the host computing system, the signature to one or more signature indexes to determine a match between the signature and an entry of the one or more signature indexes. The entry pertains to a subsequent release of the application program containing a fix to correct the error event. The method further includes, having determined the match between the signature and the respective signature index, preparing, by the host computing system from information pertaining to the subsequent release of the application program, a notification of the subsequent release of the application program, and sending the notification of the subsequent release of the application program to the end user computer, causing the notification to display on the end user computer, and enabling an update of the application program on the end user computer that prevents occurrence of the error event during execution of the application program.

In certain arrangements, the respective signature index has a first data element corresponding to a program component of the application program in which the error event occurred, and the method further includes deriving, by the host computing system, an identification of the program component of the application program from the first data element associated with the respective signature index.

Other features, functions, and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

FIG. 2a is a block diagram of an exemplary end user computer, which can be employed in the computer system environment of FIG. 1;

FIG. 2b is a block diagram of an exemplary application developer computer, which can be employed in the computer system environment of FIG. 1;

DETAILED DESCRIPTION

Techniques are disclosed herein for providing notifications to end users of software product releases that contain software fixes for particular errors or exceptional events experienced during execution of application programs. The disclosed techniques can include (i) proactively generating a signature that corresponds to an error event experienced during execution of an application program, (ii) providing the signature, along with a component-specific data element that ties the signature to a program component of the application program in which the error event occurred, to one or more hosted services for use in determining whether a subsequent release of the application program exists containing a software fix to correct the error event, and (iii) having determined that such a subsequent release of the application program exists, receiving a notification pertaining to the subsequent release of the application program, including information for downloading the subsequent release of the application program to an end user computer. In this way, notifications of software product releases that address particular errors or exceptional events experienced during execution of application programs can be provided to end users in a just-in-time (JIT) fashion for subsequent downloading of the software product releases to their respective end user computers.

Figure 1:
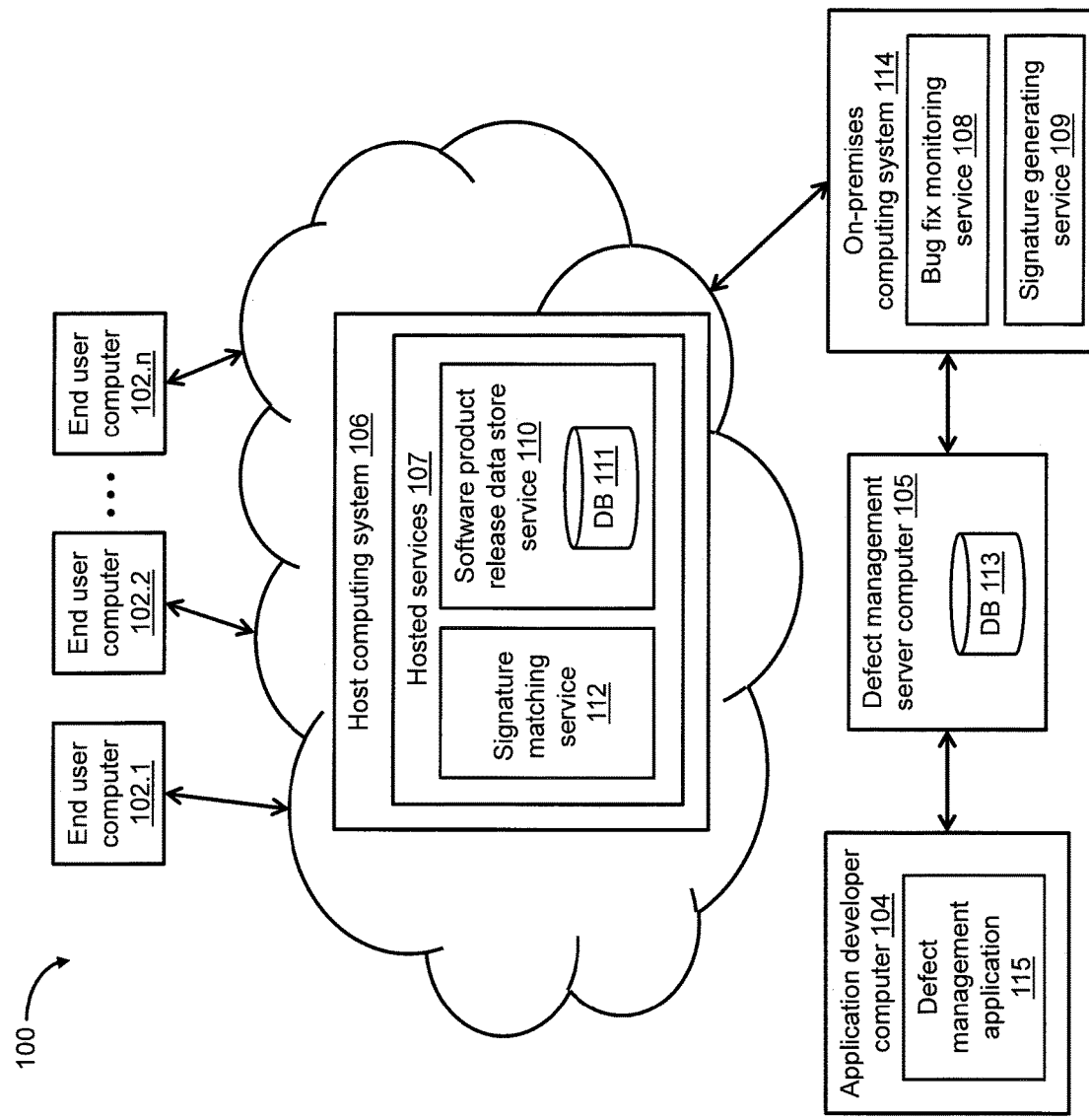
FIG. 1 is a block diagram of an exemplary computer system environment, in which techniques can be practiced for providing notifications to end users of software product releases containing software fixes for particular errors or exceptional events experienced during execution of application programs.

FIG. 1 depicts an illustrative embodiment of an exemplary computer system environment 100, in which techniques can be practiced for providing notifications to end users of software product releases containing software fixes for particular errors or exceptional events experienced during execution of application programs. As shown in FIG. 1, the computer system environment 100 can include a plurality of end user computers 102.1, 102.2, . . . , 102.n, each of which can be communicably coupled to a host computing system 106 to facilitate leveraging of services 107 (such as application services) hosted by the host computing system 106. In one embodiment, the hosted services 107 can include a software product release data store service 110, and a signature matching service 112. It is noted that the host computing system 106 can be configured as a cloud platform accessible via a network. The host computing system 106 can include one or more server computers for providing one or more terminal servers and/or workstation virtual machines. Such a server computer(s) can be configured to host the services 107 in a remote location (such as in the "cloud" or at a centralized data processing facility), and to reside on a network wired or wirelessly coupled to the respective end user computers 102.1, . . . , 102.n. As further shown in FIG. 1, the computer system environment 100 can also include an application developer computer 104, a defect management server computer 105, and an on-premises computing system 114, which can be configured to provide one or more application services such as a bug fix monitoring service 108, and a signature generating service 109. In one embodiment, the application developer computer 104 and/or the defect management server computer 105 can be located at the same premises where the on-premises computing system 114 is installed. Further, the on-premises computing system 114 can be wired or wirelessly coupled to the network upon which resides the server computer(s) hosting the services 107.

In one mode of operation, the application developer computer 104 can be configured to run a defect management application 115. Using the defect management application 115, an application developer can provide detailed information pertaining to a software fix to correct a particular error or exceptional event (generally referred to herein as a "bug") occurring during execution of an application program (such as an application program(s) 210; see FIG. 2a), and save the detailed information on the application developer computer 104. Having saved the detailed information pertaining to the software fix, the defect management application 115 running on the application developer computer 104 can push the detailed information to the defect management server computer 105, which can store the detailed information in a database (DB) 113. The bug fix monitoring service 108 provided by the on-premises computing system 114 can (i) poll the defect management server computer 105 for information pertaining to a software fix to correct a new bug or provide an update for correcting an existing bug, or (ii) receive a notification from the defect management server computer 105 when such software fix information pertaining to a new bug or an update for an existing bug has been received and stored in the DB 113.

Once the software fix information has been obtained from the defect management server computer 105, the bug fix monitoring service 108 can provide at least some of the software fix information to the signature generating service 109 provided by the on-premises computing system 114. The signature generating service 109 can generate a signature (e.g., a digital signature, a hash signature) based on the software fix information. Further, the bug fix monitoring service 108 can provide the generated signature, along with a component-specific data element that ties the signature to a program component of the application program, to the services 107 (i.e., the software product release data store service 110, the signature matching service 112) hosted by the host computing system 106 for use in determining whether a subsequent release of the application program exists containing a software fix to correct the bug that occurred during execution of the application program. Once it is determined that such a subsequent release of the application program exists, one or more of the end user computers 102.1, . . . , 102.n can receive a notification pertaining to the subsequent release of the application program from the host computing system 106, including information for downloading the subsequent release of the application program to the respective end user computer(s) 102.1, . . . , 102.n. It is noted that further disclosure relating to operation of the host computing system 106, including the hosted services 107, can be found in the illustrative example described herein.

FIG. 2a depicts a detailed view of an exemplary configuration of an end user computer 102. It is noted that each of the plurality of end user computers 102.1, . . . , 102.n of FIG. 1 can be configured like the end user computer 102 of FIG. 2a. As shown in FIG. 2a, the end user computer 102 can include a network interface 202, one or more processing units 204, a display 205, and a memory 206. The network interface 202 can be configured to connect the end user computer 102 to the host computing system 106 via a communications medium that includes one or more wired/wireless communications networks (e.g., local area network(s) (LAN(s)), metropolitan area network(s) (MAN(s)), wide area network(s) (WAN(s))), communications paths, and/or communications links. The memory 206 can be configured to include volatile storage (e.g., dynamic random access memory (DRAM), static random access memory (SRAM)) and/or non-volatile storage (e.g., magnetic memory, flash memory). The memory 206 can be further configured to store a variety of software constructs, including an operating system 208, and the application program(s) 210 running on the operating system 208. As shown in FIG. 2a, the respective application programs 210 can have one or more program components 212 (e.g., method(s), procedure(s), shared code/data), each of which can have its own error/exception handler 214. In one embodiment, each error/exception handler 214 can be configured to log or write, to one or more error/exception log files (e.g., text or data) 216, descriptive and/or summary information pertaining to particular errors (e.g., programming errors, errors encountered by the operating system 208) and/or particular exceptional events (e.g., null pointer exceptions, divide-by-zero exceptions, page fault exceptions) related to the program component 212 that were experienced during execution of the application program 210. The error/exception handler 214 can be further configured to generate, by one or more signature modules 218, a unique signature (e.g., a digital signature, a hash signature) based on the logged information, as well as a data element that specifically ties the program component(s) 212 of the application program(s) 210 to the unique signature. By affixing, binding, appending, or otherwise associating such a component-specific data element to a digital or hash signature generated based on the information logged or written to the error/exception log file(s) 216, the digital or hash signature can be made to be unique for a specified program component of the application program. The processing unit(s) 204 can be configured to operate in accordance with the various software constructs stored in the memory 206. The processing unit(s) 204 can also be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof. The display 205 can be configured as any suitable computer display capable of visually displaying character data, graphics data, and so on, to a human user.

FIG. 2b depicts a detailed view of an exemplary configuration of the application developer computer 104. Like the end user computer 102, the application developer computer 104 can include one or more processing units 222, and a memory 224. The memory 224 can be configured to include volatile storage (e.g., DRAM, SRAM) and/or non-volatile storage (e.g., magnetic memory, flash memory). The memory 224 can be further configured to store a variety of software constructs, including an operating system 226, and the defect management application 115 (see also FIG. 1) running on the operating system 226. In one embodiment, the defect management application 115 can be provided as a web application service. The defect management application 115 can be configured to update or otherwise provide a defect ticket (e.g., a text or data file) that contains descriptive and/or summary information pertaining to (i) a subsequent release of an application program, (ii) a particular error or exceptional event for which a software fix was provided in the subsequent release of the application program, and/or (iii) a program component of the application program in which the particular error or exceptional event occurred. The processing unit(s) 222 can be configured to operate in accordance with the various software constructs stored in the memory 224, and can be implemented in a variety of ways, using one or more processors running specialized software, one or more ASICs, one or more FPGAs, one or more discrete components, digital circuits, analog circuits, and so on, or any suitable combination thereof.

The disclosed techniques for providing notifications to end users of software product releases containing software fixes for particular errors or exceptional events experienced during execution of application programs will be further understood with reference to the following illustrative example. In this example, it is assumed that one of the plurality of end user computers 102.1, . . . , 102.n, embodied as the end user computer 102 (see FIG. 2a), is configured to execute a current release of the application program 210, which has the program component 212. For example, the application program 210 may be a Java® application program, or any other suitable application program. During execution of the application program 210 on the operating system 208 of the end user computer 102, a particular exceptional event occurs related to the program component 212, causing an exception to be thrown within the application program 210. For example, the exceptional event may correspond to a null pointer exception, a divide-by-zero exception, a page fault exception, or any other suitable exceptional event, occurring in the code of the program component 212.

In this example, once the exception is thrown within the application program 210, the operating system 208 of the end user computer 102 automatically generates a stack trace, or any other suitable report of the particular exceptional event occurring during execution of the application program 210. In one embodiment, the stack trace can include a sequence of methods or procedures of the program component code that were called during execution of the application program 210, at least up to the point where the particular exceptional event occurred. For example, if the particular exceptional event corresponds to a null pointer exception, then an exemplary representation of the stack trace may be expressed as illustrated in TABLE I:

TABLE I

Exception in thread 'main' java.lang.NullPointerException

| | |
|---|---|
| at com.example.mydemo.Team.getName(Team.java:12) | (1) |
| at com.example.mydemo.Player.getTeamName(Player.java:30) | (2) |
| at com.example.mydemo.Bootstrap.main(Bootstrap.java:21). | (3) |

As illustrated in TABLE I, the exemplary representation of the stack trace includes multiple stack frames (referenced by reference numerals (1), (2), and (3)), each of which includes a string of unstructured data relating to a name of the application program 210, a method name, a file name, a line number, and so on. For example, the stack frame referenced by reference numeral (1) may include the application name "com.example.mydemo," a method name "getName," a file name "Team.java," and a line number "12." Further, the stack frame referenced by reference numeral (2) may include the application name "com.example.mydemo," a method name "getTeamName," a file name "Player.java," and a line number "30." In addition, the stack frame referenced by reference numeral (3) may include the application name "com.example.mydemo," a method name "main," a file name "Bootstrap.java," and a line number "21." Accordingly, with regard to the stack trace of TABLE I, the sequence of methods of the program component 212 called during execution of the application program 210, at least up to the point where the null pointer exception was thrown, includes the methods "main," "get TeamName," and "getName."

Once the stack trace is generated by the operating system 208 of the end user computer 102, the error/exception handler 214 logs or otherwise writes the stack trace to the error/exception log file 216, and the signature module 218 generates a unique signature (e.g., a digital signature, a hash signature) based on the logged stack trace information. It is noted that the signature module 218 can employ any suitable technique for generating the unique signature, so long as the resulting unique signature operates to identify the particular exceptional event occurring during execution of the application program 210. For example, one technique for generating the unique signature for the particular exceptional event may include (i) parsing the stack trace to remove any arbitrary alphanumeric characters from the unstructured data, (2) using one or more regular expressions (regex) to identify pertinent information relating to the particular exceptional event in the unstructured data, and (3) applying a hash or digital signature algorithm, such as MD5, SHA1, SHA256, or any other suitable hash or digital signature algorithm, to the pertinent information to obtain the unique signature.

Having generated the unique signature for the particular exceptional event, the signature module 218 further generates a data element that specifically ties the unique signature to the program component 212 of the application program 210. In one embodiment, the data element can take the form of a prefix, an infix, or a suffix added to the unique signature. For example, for the program component 212, the data element may be generated from the program component's version number, release number, release name, release date, and/or any other suitable component-specific information, so long as the resulting data element operates to identify the program component 212. Once the component-specific data element is generated, the signature module 218 affixes, binds, appends, or otherwise associates the data element to the unique signature.

In this example, the application developer computer 104 (see FIG. 2b) is configured to provide a software fix for the particular exceptional event (e.g., the null pointer exception) in a subsequent release of the application program 210. Once the software fix for the particular exceptional event is provided in the subsequent release, the defect management application 115, running on the operating system 226 of the application developer computer 104, updates or otherwise provides a defect ticket that contains information pertaining to (i) the subsequent release of the application program 210, (ii) the particular exceptional event for which the software fix was provided, and (iii) the program component 212 in which the exception was thrown. For example, the information pertaining to the subsequent release of the application program 210 may include an identification of the subsequent release, and a hyperlink to a location where the subsequent release can be accessed for download to the end user computer 102. Further, the information relating to the particular exceptional event (e.g., the null pointer exception) may include a stack trace that is the same as that generated by the operating system 208 of the end user computer 102 (see TABLE I). In addition, the information pertaining to the program component 212 may include the program component's version number, release number, release name, release date, and/or any other suitable component-specific information.

Once the defect ticket is updated or otherwise provided by the defect management application 115 running on the application developer computer 104, the defect management application 115 pushes the defect ticket to the defect management server computer 105, which stores the defect ticket in the DB 113. Further, the bug fix monitoring service 108 provided by the on-premises computing system 114 detects the defect ticket (such as by polling the defect management server computer 105, or by receiving a notification from the defect management server computer 105), accesses the information pertaining to the particular exceptional event (e.g., the null pointer exception) contained in the defect ticket (i.e., the stack trace), and provides the accessed information to the signature generating service 109, which is also provided by the on-premises computing system 114. In one embodiment, the bug fix monitoring and signature generating services 108, 109 can be provided by separate computing systems. The signature generating service 109 generates a hash or digital signature based on the stack trace information. In one embodiment, the bug fix monitoring and signature generating services 108, 109 provided by the on-premises computing system 114 can service a number of specific software products, including the application program 210. Because it is provided to specifically service the application program 210, the signature generating service 109 employs a technique that is the same as that employed by the signature module 218 of the end user computer 102 to generate unique hash or digital signatures for exceptional events occurring during execution of the application program 210. As a result, the hash or digital signature generated by the signature generating service 109 based on the stack trace information contained in the defect ticket is equal or equivalent to the unique signature generated by the signature module 218 based on the same stack trace information.

In addition, the signature generating service 109 generates a data element that specifically ties the (unique) hash or digital signature to the program component 212 of the application program 210, based on the information pertaining to the program component 212 contained in the defect ticket, namely, the program component's version number, release number, release name, release date, and/or any other suitable component-specific information. Because it is provided to specifically service the application program 210, the signature generating service 109 can generate a component-specific data element that is equal or equivalent to that generated by the signature module 218. Having generated the (unique) hash or digital signature and the component-specific data element, the signature generating service 109 affixes, binds, appends, or otherwise associates the data element to the (unique) hash or digital signature. The bug fix monitoring service 108 provides the (unique) hash or digital signature and its associated component-specific data element, as well as the information pertaining to the subsequent release of the application program 210 contained in the defect ticket, to the software product release data store service 110 hosted by the host computing system 106, which stores the subsequent release information as a data store entry in a database (DB) 111, effectively indexed by the (unique) hash or digital signature.

Once the component-specific data element is affixed, bound, appended, or otherwise associated to the unique signature generated by the signature module 218, the end user computer 102 provides the unique signature to the signature matching service 112 hosted by the host computing system 106, which determines whether the unique signature matches any of the signature indexes of data store entries stored in the DB 111 by the software product release data store service 110. To that end, the signature matching service 112 compares the unique signature to the respective signature indexes of data store entries in the DB 111, and determines that the unique signature does indeed match the (unique) hash or digital signature index generated by the signature generating service 109 provided by the on-premises computing system 114. Further, the signature matching service 112 derives an identification of a program component from the component-specific data element associated with the matching signature index, and determines that the identification is indicative of the program component 212 of the application program 210.

Having determined that the derived identification is indicative of the program component 212 of the application program 210, the signature matching service 112 interacts with the software product release data store service 110 to obtain the subsequent release information for the application program 210 from the data store entry in the DB 111 indexed by the matching signature index. The signature matching service 112 also prepares and sends a notification to the end user computer 102 that includes (i) information pertaining to the particular exceptional event (e.g., the null pointer exception) experienced during execution of the application program 210, (ii) an identification of the subsequent release of the application program 210 containing the software fix for the particular exceptional event, and (iii) a hyperlink to a location where the subsequent release of the application program 210 can be accessed for download to the end user computer 102. In this example, the notification to the end user is displayed on the display 205 of the end user computer 102, and has an exemplary format, as follows:

Exception in program component of application "com.example.mydemo"

Fixed in release 2.0 of application "com.example.mydemo"

Click on download link: com.example.mydemo app release 2.0

By proactively generating a unique signature that corresponds to a particular error or exceptional event experienced during execution of a current release of an application program, providing the unique signature, along with a component-specific data element that ties the unique signature to a program component of the application program in which the particular error or exceptional event occurred, to one or more hosted services for use in determining whether a subsequent release of the application program exists containing a software fix for the particular error or exceptional event, and, having determined that such a subsequent release of the application program exists, receiving a notification pertaining to the subsequent release of the application program, including information for downloading the subsequent release of the application program to an end user computer, notifications of software product releases that address particular errors or exceptional events experienced during execution of application programs can be provided to end users in a just-in-time (JIT) fashion for subsequent downloading of the software product releases to their respective end user computers.

Figure 3:
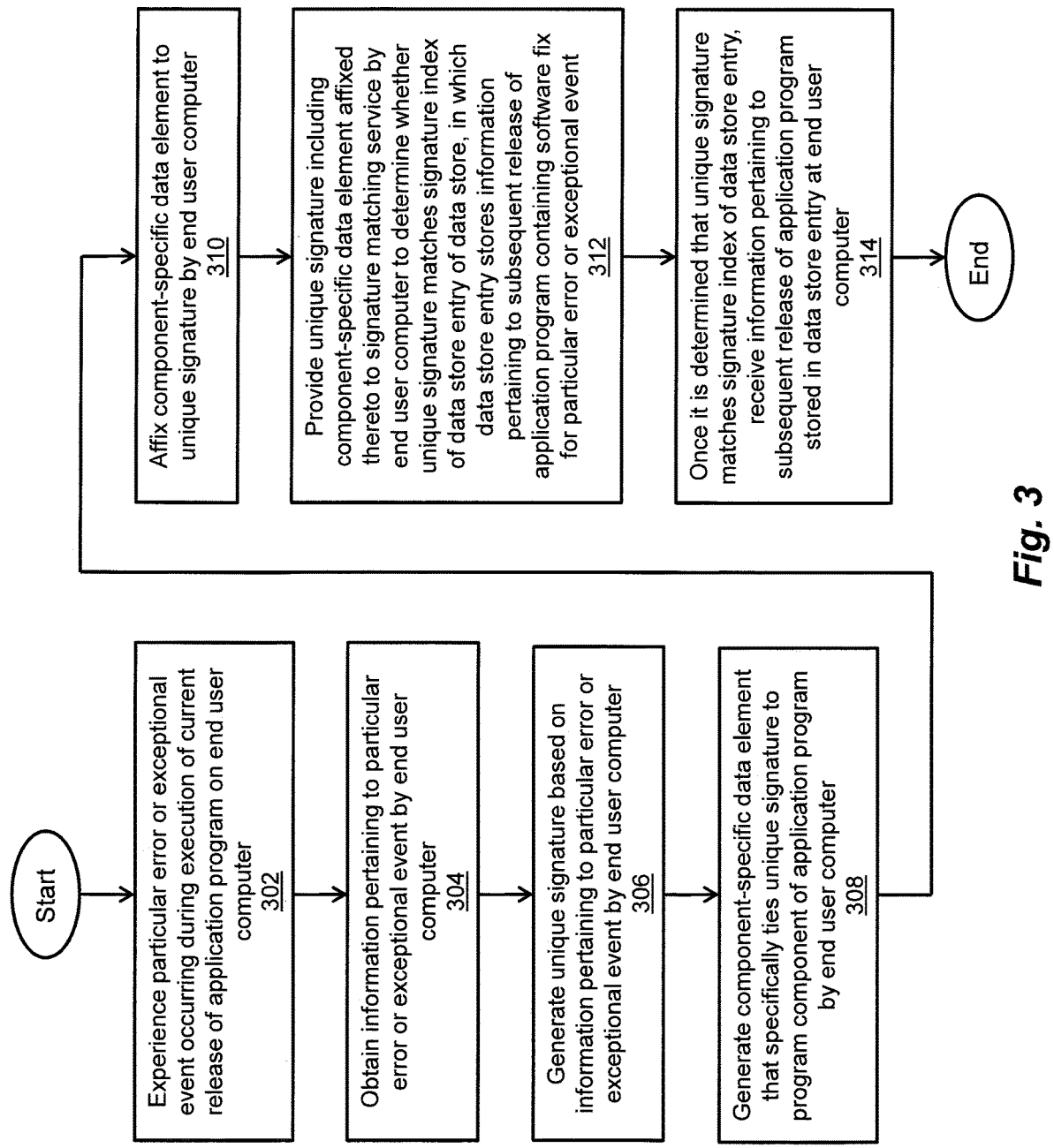
FIG. 3 is a flow diagram of an exemplary method of an end user computer for receiving an end user notification of a software product release containing a software fix for a particular error or exceptional event experienced during execution of an application program.

An exemplary method of an end user computer for receiving an end user notification of a software product release containing a software fix for a particular error or exceptional event experienced during execution of an application program is described herein with reference to blocks 302, 304, 306, 308, 310, 312, and 314 illustrated in FIG. 3. It is noted that further disclosure relating to acts set forth in blocks 302, 304, 306, 308, 310, 312, and 314 of FIG. 3 can be found in the illustrative example described herein. As depicted in block 302, a particular error or exceptional event occurring during execution of a current release of an application program is experienced on an end user computer. As depicted in block 304, information pertaining to the particular error or exceptional event is obtained by the end user computer. As depicted in block 306, a unique signature based on the information pertaining to the particular error or exceptional event is generated by the end user computer. As depicted in block 308, a component-specific data element that specifically ties the unique signature to a program component of the application program is generated and affixed to the unique signature by the end user computer. As depicted in block 310, the unique signature including the component-specific data element affixed thereto are provided to a signature matching service by the end user computer to determine whether the unique signature matches a signature index of a data store entry of a data store, in which the data store entry stores information pertaining to a subsequent release of the application program containing a software fix for the particular error or exceptional event. As depicted in block 312, once it is determined that the unique signature matches the signature index of the data store entry, the information pertaining to the subsequent release of the application program stored in the data store entry is received at the end user computer.

Figure 4:
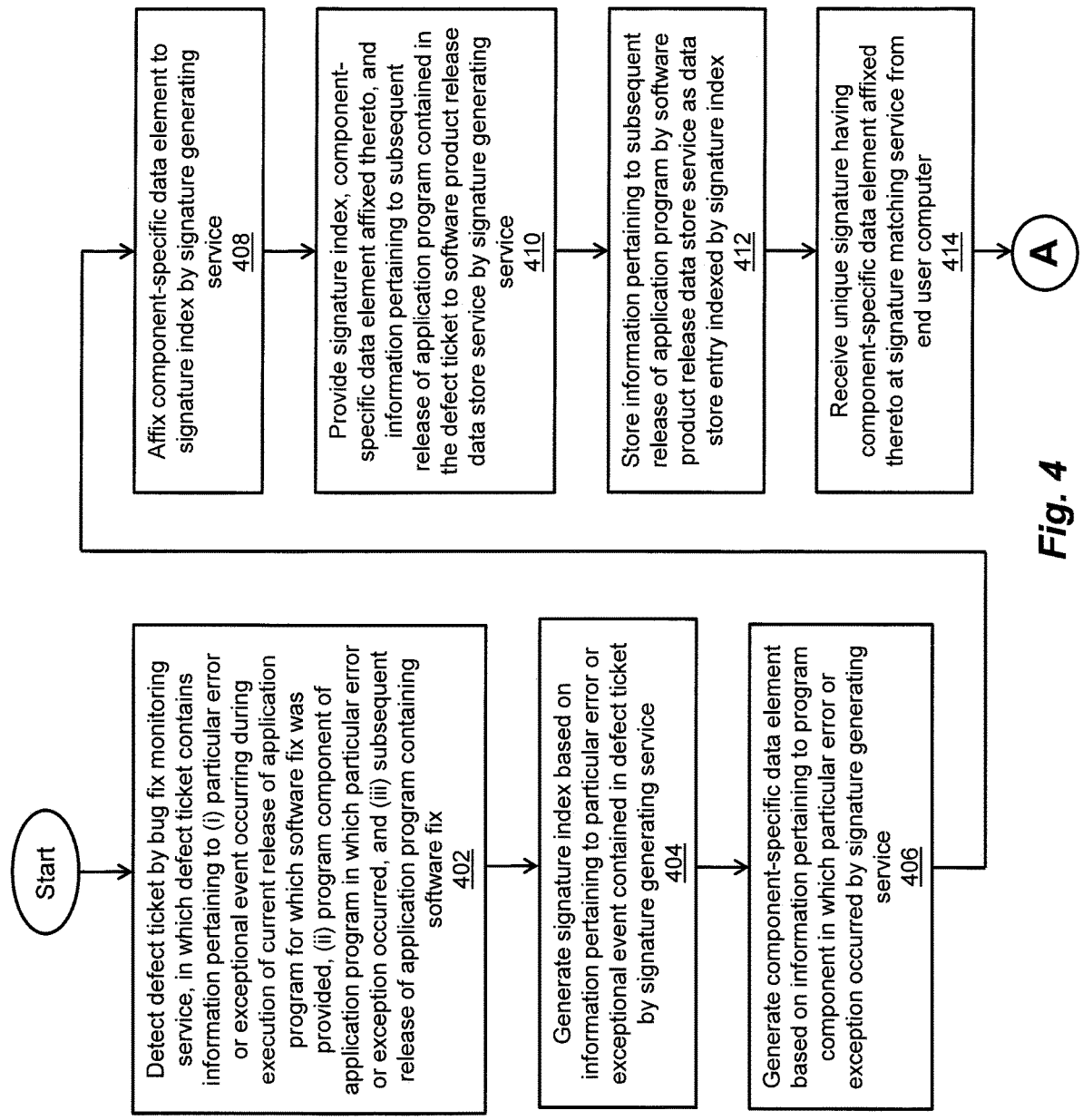
FIG. 4 is a flow diagram of an exemplary method of one or more hosted services for providing a notification to an end user of a software product release containing a software fix for a particular error or exceptional event experienced during execution of an application program.
Figure 4:
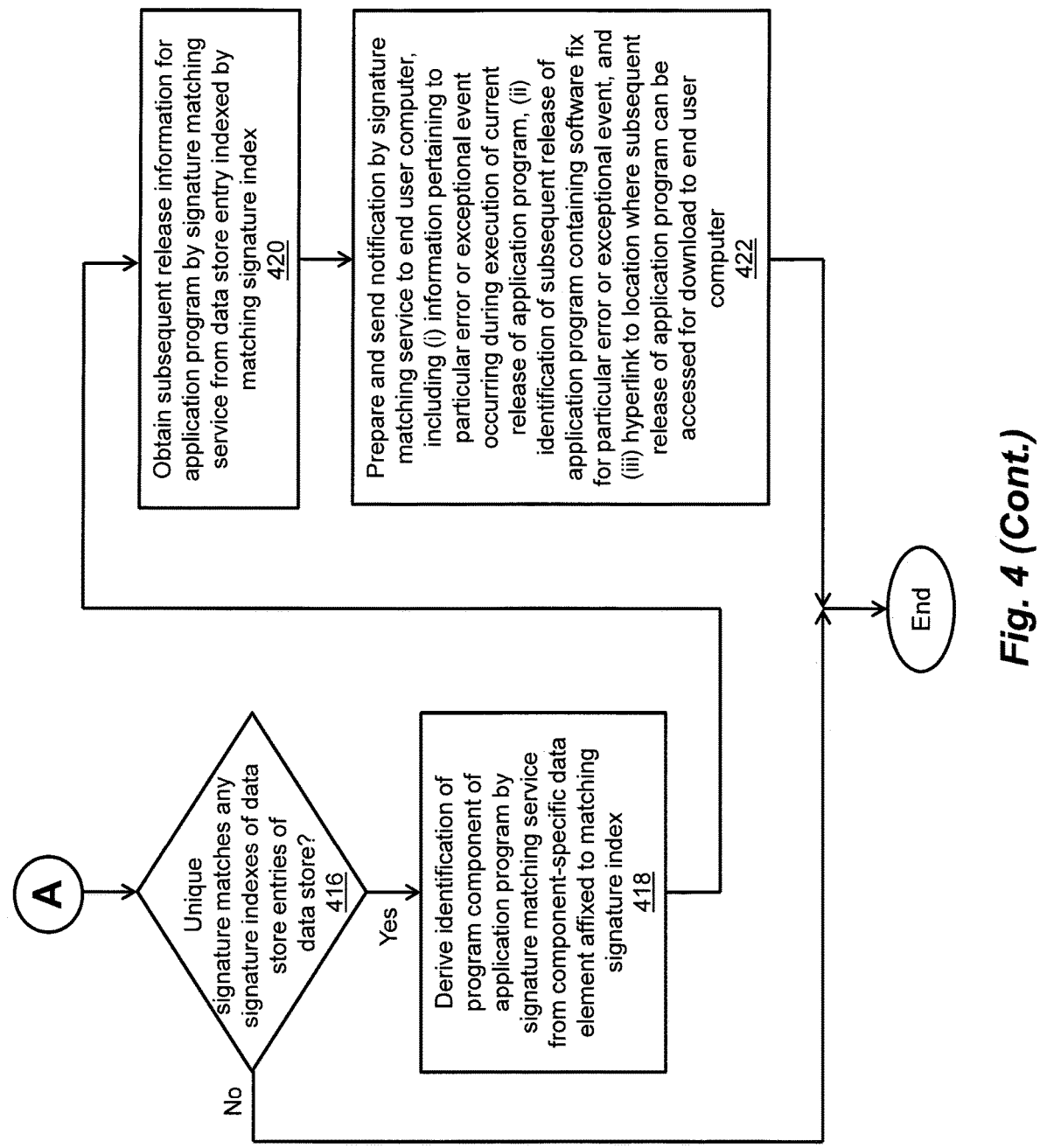

An exemplary method of one or more hosted services for providing a notification to an end user of a software product release containing a software fix for a particular error or exceptional event experienced during execution of an application program is described herein with reference to blocks 402, 404, 406, 408, 410, 412, 414, 416, 418, 420, and 422 illustrated in FIG. 4. It is noted that further disclosure relating to acts set forth in blocks 402, 404, 406, 408, 410, 412, 414, 416, 418, 420, and 422 of FIG. 4 can be found in the illustrative example described herein. As depicted in block 402, a defect ticket is detected by a bug fix monitoring service, in which the defect ticket contains information pertaining to (i) a particular error or exceptional event occurring during execution of a current release of an application program for which a software fix was provided, (ii) a program component of the application program in which the particular error or exception occurred, and (iii) a subsequent release of the application program containing the software fix. As depicted in block 404, a signature index based on the information pertaining to the particular error or exceptional event contained in the defect ticket is generated by a signature generating service. As depicted in block 406, a component-specific data element based on the information pertaining to the program component in which the particular error or exception occurred is generated by the signature generating service. As depicted in block 408, the component-specific data element is affixed to the signature index by the signature generating service. As depicted in block 410, the signature index, the component-specific data element affixed thereto, and the information pertaining to the subsequent release of the application program contained in the defect ticket are provided to a software product release data store service by the signature generating service.

As depicted in block 412, the information pertaining to the subsequent release of the application program is stored by the software product release data store service as a data store entry indexed by the signature index. As depicted in block 414, a unique signature having a component-specific data element affixed thereto is received at a signature matching service from an end user computer. As depicted in block 416, a determination is made by the signature matching service as to whether the unique signature matches any of multiple signature indexes of data store entries stored by the software product release data store service. As depicted in block 418, having determined that the unique signature matches one of the signature indexes of data store entries, an identification of the program component of the application program is derived by the signature matching service from the component-specific data element associated with the matching signature index. As depicted in block 420, having derived the identification of the program component of the application program, the subsequent release information for the application program is obtained by the signature matching service from the data store entry indexed by the matching signature index. As depicted in block 422, a notification is prepared and sent by the signature matching service to the end user computer, including (i) information pertaining to the particular error or exceptional event occurring during execution of the current release of the application program, (ii) an identification of the subsequent release of the application program containing the software fix for the particular error or exceptional event, and (iii) a hyperlink to a location where the subsequent release of the application program can be accessed for download to the end user computer.

Having described the foregoing illustrative embodiments, other alternative embodiments and/or variations may be made and/or practiced. For example, it was described herein that, once an exception is thrown within an application program, the operating system of an end user computer could automatically generate a stack trace, and that a signature module running on the end user computer could generate a unique signature based on the stack trace information. In an alternative embodiment, the signature module can be configured to generate a unique signature based on certain unstructured descriptive information pertaining to an error or exceptional event, unstructured information contained in a snapshot on a display screen at the time of the error or exceptional event, and/or any other suitable structured and/or unstructured information or artifacts pertaining to the error or exceptional event. In a further alternative embodiment, multiple signature modules can be provided that employ different techniques for generating unique signatures based on different types of errors or exceptional events experienced during execution of the application program, and/or different versions of the application program or program component(s) executing on the end user computer.

It was further described herein that an end user computer could execute a current release of an application program having one or more program components. In certain embodiments, the application program can be a local client-based application program, a remote server-based application program, a remote cloud-based application program, a web application program, a mobile device-based application program, or any other suitable application program. In certain further embodiments, the application program can have remotely based program components, locally based program components, or a hybrid of remotely and locally based program components.

It was also described herein that a software product release data store could be provided as a hosted service. In an alternative embodiment, the software product release data store can be configured as an off-line data store. In a further alternative embodiment, an end user computer can be configured to incorporate a local software product release data store, which can be periodically refreshed by an online (e.g., cloud-based) data store service. In another alternative embodiment, one or more signature modules running on the end user computer can be periodically refreshed by an online (e.g., cloud-based) signature generating service.

It was further described herein that, once an exception is thrown within an application program running on an end user computer, an operating system of the end user computer could automatically generate a stack trace, including a sequence of methods or procedures of program component code that were called during execution of the application program. In certain embodiments, the operating system of the end user computer can generate a complete stack trace, or a partial stack trace up to the point where the exception was thrown. In each such embodiment, an error/exception handler directly associated with the application program can generate the complete or partial stack trace to avoid having any unknown stack frames (e.g., stack frames whose file path is unknown) in the stack trace. For example, such unknown stack frames in a stack trace may result from calls to an external shared library, such as a dynamic-link library (DLL).

It was also described herein that a unique signature could be generated that corresponds to a particular error or exceptional event experienced during execution of a current release of an application program, and that the unique signature could be provided to one or more hosted services for use in determining whether a subsequent release of the application program exists containing a software fix for the particular error or exceptional event. In certain embodiments, the subsequent release of the application program can be obtained by effectively mapping the unique signature of the particular error or exceptional event to the subsequent release of the application program, or, more generally, effectively mapping a particular error or exceptional event to a resolution of the particular error or exceptional event.

It was further described herein that a host computing system (e.g., the host computing system 106; see FIG. 1) could be configured as a cloud platform accessible via a network. In one embodiment, the host computing system can be configured as a private cloud platform accessible via a private network (e.g., a corporate network) protected by a firewall and/or gateway computer. In such a configuration, the gateway computer can be configured to perform functions of a proxy module (e.g., an ICA® proxy module) disposed between an end user computer and one or more hosted services (e.g., the hosted services 107; see FIG. 1) for carrying out the various techniques disclosed herein. For example, such a proxy module may be configured to act as the respective hosted services to the end user computer, and to act as the end user computer to the respective hosted services.

It was also described herein that a signature generating service of a host computing system (e.g., the signature generating service 109; see FIG. 1) could employ a technique that is the same as that employed by a signature module of an end user computer to generate a unique hash or digital signature for an error or exceptional event occurring during execution of an application program. In an alternative embodiment, such a unique hash or digital signature can be included in a defect ticket alongside error/exceptional event information to which the hash/digital signature pertains. In this way, the need for the signature generating service to generate the hash/digital signature can be avoided. In a further alternative embodiment, the signature generating service can generate the hash/digital signature based on the error/exceptional event information contained in the defect ticket, and can verify the generated hash/digital signature against the hash/digital signature provided in the defect ticket. In another alternative embodiment, such error/exceptional event information and/or other software bug details can be provided as attachments or hyperlinks to log files, and the host computing system can process such information and/or details to obtain a unique signature.

It was further described herein that a signature matching service of a host computing system (e.g., the signature matching service 112; see FIG. 1) could prepare and send a notification to an end user computer that includes a hyperlink to a location where a subsequent release of an application program can be accessed for download to the end user computer. In an alternative embodiment, such a notification can include a hyperlink to a knowledge base (KB) or support article with details regarding how to download and/or install the subsequent release, as well as how to apply and/or configure the subsequent release.

Although features have been shown and described herein with reference to particular illustrative embodiments thereof, such features may be included and are hereby included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk (CD), digital versatile disk (DVD), optical disk, flash drive, solid state drive (SSD), secure digital (SD) chip or device, application specific integrated circuit (ASIC), field programmable gate array (FPGA), and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, or whether it is conjugated with a singular or plural verb. Further, although ordinal expressions, such as "first," "second," "third," and so on, may be used as adjectives herein, such ordinal expressions are used for identification purposes, and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems, apparatus, and methods are not limited to these particular embodiments.

While various embodiments of the disclosed systems, apparatus, and methods have been particularly shown and described, it will be understood by those skilled in the art that various changes in form and/or details may be made therein, without departing from the scope of the disclosure.

What is claimed is:

1. A method comprising:

receiving, at a host computing system from an end user computer, a signature that corresponds to an error event occurring during execution of an application program on the end user computer, the signature having a data element associated therewith that ties the signature to a program component of the application program in which the error event occurred, and makes the signature unique for the program component;

comparing, by the host computing system, the signature to one or more signature indexes to determine a match between the signature and an entry of the one or more signature indexes, the entry pertaining to a subsequent release of the application program containing a fix to correct the error event;

having determined the match between the signature and the respective signature index, preparing, by the host computing system from information pertaining to the subsequent release of the application program, a notification of the subsequent release of the application program; and sending the notification of the subsequent release of the application program to the end user computer to cause the notification to display on the end user computer, and to enable an update of the application program on the end user computer that prevents occurrence of the error event in the program component during execution of the application program.

2. The method of claim 1 further comprising:

deriving, by the host computing system, an identification of the program component of the application program from the data element associated with the signature.

3. The method of claim 2 wherein the fix to correct the error event is included in a defect ticket stored by a defect management server computer, and wherein the method further comprises:

detecting the defect ticket stored by the defect management server computer.

4. The method of claim 3 wherein the detecting of the defect ticket includes polling the defect management server computer for the defect ticket.

5. The method of claim 3 wherein the defect ticket contains information pertaining to the error event for which the fix was provided, and wherein the method further comprises:

having detected the defect ticket, accessing the information pertaining to the error event from the defect ticket; and
 generating the signature based on the information pertaining to the error event associated with the information of the defect ticket.

6. The method of claim 3 wherein the defect ticket contains information pertaining to the program component of the application program in which the error event occurred, and wherein the method further comprises:

having detected the defect ticket, accessing the information pertaining to the program component of the application program from the defect ticket; and
 generating the data element associated with the signature based on the information pertaining to the program component from the defect ticket.

7. The method of claim 3 wherein the defect ticket contains information pertaining to the subsequent release of the application program, and wherein the method further comprises:

having detected the defect ticket, accessing the information pertaining to the subsequent release of the application program from the defect ticket,
 wherein the preparing of the notification of the subsequent release of the application program includes preparing the notification from the information pertaining to the subsequent release accessed from the defect ticket, and
 wherein the information pertaining to the subsequent release of the application program includes a hyperlink to a location where the subsequent release can be accessed for download to the end user computer.

8. A system comprising:

at least one server computer configured to host specified services, the hosted specified services including a hosted signature matching service,
  wherein the hosted signature matching service is configured:
   to receive, from an end user computer, a signature that corresponds to an error event occurring during execution of an application program on the end user computer, the signature having a data element associated therewith that ties the signature to a program component of the application program in which the error event occurred, and makes the signature unique for the program component;
   to compare the signature to one or more signature indexes to determine a match between the signature and an entry of the one or more signature indexes, the entry pertaining to a subsequent release of the application program containing a fix to correct the error event;
   having determined the match between the signature and the respective signature index, to prepare, from information pertaining to the subsequent release of the application program, a notification of the subsequent release of the application program; and
   to send the notification of the subsequent release of the application program to the end user computer to cause the notification to display on the end user computer, and to enable an update of the application program on the end user computer that prevents occurrence of the error event in the program component during execution of the application program.

9. The system of claim 8 wherein the hosted signature matching service is further configured to derive an identification of the program component of the application program from the first data element associated with the signature.

10. The system of claim 9 wherein the fix to correct the error event is included in a defect ticket stored by a defect management server computer, wherein at least one second server computer provides a monitoring service, and wherein the monitoring service is configured to detect the defect ticket provided by the defect management server computer.

11. The system of claim 10 wherein the monitoring service is further configured to poll the defect management server computer for the defect ticket.

12. The system of claim 10 wherein the defect ticket contains information pertaining to the error event for which the fix was provided, and wherein the monitoring service is further configured, having detected the defect ticket, to access the information pertaining to the error event from the defect ticket.

13. The system of claim 12 wherein the at least one second server computer further provides a signature generating service, and wherein the signature generating service is configured to generate the signature based on the information pertaining to the error event associated with the information of the defect ticket.

14. The system of claim 10 wherein the defect ticket contains information pertaining to the program component of the application program in which the error event occurred, and wherein the monitoring service is further configured, having detected the defect ticket, to access the information pertaining to the program component of the application program from the defect ticket.

15. The system of claim 14 wherein the at least one second server computer further provides a signature generating service, and wherein the signature generating service is configured to generate the data element associated with the signature based on the information pertaining to the program component from the defect ticket.

16. The system of claim 10 wherein the defect ticket contains information pertaining to the subsequent release of the application program, and wherein the monitoring service is further configured, having detected the defect ticket, to access the information pertaining to the subsequent release of the application program from the defect ticket, wherein the hosted signature matching service is further configured to prepare the notification from the information pertaining to the subsequent release accessed from the defect ticket, and wherein the information pertaining to the subsequent release of the application program includes a hyperlink to a location where the subsequent release can be accessed for download to the end user computer.

17. A computer program product including non-transitory, computer-readable media having instructions that, when executed by control circuitry of a computerized apparatus, cause the control circuitry to perform a method comprising:

receiving, at a host computing system from an end user computer, a signature that corresponds to an error event occurring during execution of an application program on the end user computer, the signature having a data element associated therewith that ties the signature to a program component of the application program in which the error event occurred, and makes the signature unique for the program component;

comparing, by the host computing system, the signature to one or more signature indexes to determine a match between the signature and an entry of the one or more signature indexes, the entry pertaining to a subsequent release of the application program containing a fix to correct the error event;

having determined the match between the signature and the respective signature index, preparing, by the host computing system from information pertaining to the subsequent release of the application program, a notification of the subsequent release of the application program; and sending the notification of the subsequent release of the application program to the end user computer to cause the notification to display on the end user computer, and to enable an update of the application program on the end user computer that prevents occurrence of the error event in the program component during execution of the application program.

18. The computer program product of claim 17, wherein the method further comprises:

deriving, by the host computing system, an identification of the program component of the application program from the data element associated with the signature.

\* \* \* \* \*